United States Patent [19]

Toyama et al.

[11] Patent Number: 4,686,138

[45] Date of Patent: Aug. 11, 1987

[54] DIRECT IMAGE OFFSET PRINTING PLATES

[75] Inventors: Koji Toyama; Hideo Shimizu, both of Tokyo, Japan

[73] Assignee: Mitsubishi Paper Mills, Ltd., Tokyo, Japan

[21] Appl. No.: 872,875

[22] Filed: Jun. 11, 1986

[30] Foreign Application Priority Data

Jun. 13, 1985 [JP] Japan ............................... 60-129462
Jun. 18, 1985 [JP] Japan ............................... 60-133873

[51] Int. Cl.[4] ............................................... G11B 5/62

[52] U.S. Cl. .................................... 428/323; 428/211; 428/331

[58] Field of Search ......................... 428/211, 323, 331

[56] References Cited

U.S. PATENT DOCUMENTS

| | | | |
|---|---|---|---|
| 4,440,827 | 4/1984 | Miyamoto et al. | 427/391 |
| 4,460,637 | 7/1984 | Miyamoto et al. | 428/211 |
| 4,478,910 | 10/1984 | Oshima et al. | 428/211 |
| 4,481,244 | 11/1984 | Haruta | 428/211 |
| 4,610,924 | 9/1986 | Tamagawa et al. | 428/211 |

*Primary Examiner*—William J. Van Balen
*Attorney, Agent, or Firm*—Cushman, Darby & Cushman

[57] ABSTRACT

There is disclosed a direct image printing plate for offset printing which comprises a water resistant support and an image receiving layer provided thereon which comprises an inorganic pigment and a mixed binder comprising a water-soluble high polymer compound and a synthetic high polymer latex. There is also disclosed a direct image printing plate for offset printing which comprises a water resistant support and an image receiving layer provided thereon which comprises a mixed pigment comprising a synthetic silica fine powder of 20μ or less in particle diameter and a colloidal silica of 50 mμ or less in particle diameter and a binder which is preferably polyvinyl alcohol.

11 Claims, No Drawings

DIRECT IMAGE OFFSET PRINTING PLATES

BACKGROUND OF THE INVENTION

This invention relates to a direct image printing plate and more, particularly, it relates to a direct image printing plate from which a printing plate can be directly made by impact type printers such as type printer, wire dot printer, etc.

At present as offset printing plates used in the field of light printing there are those of (1) direct image type comprising a water-resistant support and an image receiving layer provided thereon, (2) electrophotographic type comprising a water-resistant support and a photoconductive layer provided thereon, (3) silver salt photographic type comprising a water-resistant support and a silver halide emulsion layer provided thereon, etc. Of these types of the master plates those of the type (1) have some advantages over those of (2) and (3) in that printing plates can be directly made by handwriting on the image receiving layer with oily inks or by PPC machine.

Due to the recent spread of office automation devices, especially word processors, there have been demanded direct image printing plates from which printing plates can be directly made by these devices. In case of plate-making by word processors, impact type printers such as type printers, wire dot printers, etc. are often used and direct imaging is made on the direct image printing plates through a fabric ink ribbon impregnated with a printer ink comprising coloring matters such as pigments, oil-soluble dyes, etc. and solvents such as mineral oils, vegetable oils, etc. The printer ink transferred to the image receiving layer by the impression is fixed thereon and exhibits oleophilicity there and forms image areas for printing. It is important for obtaining clear prints that the image receiving layer of the direct image printing plates have good fixing property for thus transferred printer ink.

The conventional direct image printing plates comprise a water-resistant support having thereon an image receiving layer mainly composed of an inorganic pigment such as kaolin clay, zinc oxide or the like and a binder comprising a water-soluble high polymer compound such as polyvinyl alcohol, starch, carboxymethyl cellulose or the like. This image receiving layer is generally required to have hydrophilicity and simultaneously water-resistance and besides fixability for printer ink, etc. However, the hydrophilicity and the water-resistance antipodal to each other and there have been the problems that increase in the water-resistance leads to insufficiency in hydrophilicity to often cause scumming. On the contrary, increase in hydrophilicity leads to insufficiency in water-resistance to often cause peeling of the image receiving layer. Therefore, in order to obtain image receiving layers having both the hydrophilicity and the water-resistance, there have been proposed use of two water-soluble high polymer compounds in admixture as a binder such as a mixture of carboxymethyl cellulose and polyamide epichlorohydrin, for example, in Japanese Patent Unexamined Publication (Kokai) No. 1791/82 and a mixture of carboxymethyl cellulose and polyglycidyl ether compound, for example, in Japanese Patent Unexamined Publication (Kokai) No. 135190/84.

However, image receiving layers containing these mixtures as binders show good fixability for toners in PPC copiers, but very low fixability for printer ink and printing plates having these image receiving layers cannot provide clear prints. That is, the conventional direct image printing plates having both the hydrophilicity and the water-resistance have the defect that they do not have good fixability for printer ink.

SUMMARY OF THE INVENTION

The object of this invention is to provide a direct image printing plate having an image receiving layer which possesses both the water-resistance and the hydrophilicity and have good fixability for printer ink and furthermore, for tonors of PPC copiers.

DESCRIPTION OF THE INVENTION

The above object of this invention can be accomplished by providing on a water-resistant support an image receiving layer mainly composed of an inorganic pigment and a mixed binder comprising a water-soluble high polymer compound and a synthetic high polymer latex.

The above object can also be attained by providing on a water-resistant support an image receiving layer which contains a mixed pigment comprising a synthetic silica fine powder of 20μ or less in diameter and a colloidal silica of 50 mμ or less in diameter. In this case, preferably polyvinyl alcohol is used as a binder.

The reasons why the conventional direct image printing plates having an image receiving layer which possesses both the water-resistance and the hydrophilicity are inferior in fixability for printer ink have been carefully investigated. As a result, it has been found that the solvent-resistance, i.e., a strong barrier property, of the water-soluble high polymer compound used as a binder greatly deteriorate the fixability for printer ink based on a solvent such as a mineral oil. Reduction of amount of the binder comprising the water-soluble high polymer compound has been attempted in order to weaken the barrier property. However, the fixability for printer ink has been fairly increased, but the fixation still has to be acceralated using a heating device such as fuser. Furthermore, reduction in the amount of binder results in conspicuous decrease of adhesion to PPC toners and thus it has been impossible by only reducing the amount of binder in the image receiving layer to produce a balanced direct image printing plate.

As a result of searching for materials having good affinity with printer inks, oleophilic materials such as synthetic high polymer latex and the like have been found, but they have not been used as binders of image receiving layer because of low hydrophilicity.

The inventors have found that when a synthetic high polymer latex in such an amount that no continuous film is formed is mixed with a water-soluble high polymer compound and this mixture is used as a binder, fixability for printer ink can be greatly improved without causing reductions in hydrophilicity of image receiving layer and in fixability for PPC toners and several hundreds prints can be printed even when printing is carried out immediately after making of printing plate.

The mixing ratio of the water-soluble high polymer compound and the synthetic high polymer latex is preferably 5 to 80, especially preferably 10 to 30 parts of the synthetic high polymer latex for 100 parts (by weight) of the water-soluble high polymer compound. When the amount of the synthetic high polymer latex is more than 80 parts, a continuous film of latex particles is formed to result in conspicuous reduction of hydrophilicity of image receiving layer and cause stains in background. When less than 5 parts, effect brought about by addition of the synthetic high polymer latex is insufficient and clear prints cannot be obtained.

Amount of addition of the mixed binder to the inorganic pigment is preferably 3 to 30 parts for 100 parts (by weight) of the pigment in view of the relation between fixability for printer ink and fixability for PPC toners.

As the water-soluble high polymer compounds used for binder in this invention, mention may be made of, for example, polyvinyl alcohol, modified polyvinyl alcohol, starch, oxidized starch, carboxymethyl cellulose, hydroxyethyl cellulose, casein, gelatin, polyacrylic acid salts, polyvinyl pyrrolidone, polyvinyl ether-maleic anhydride copolymer, polyamides, polyacrylamide, etc. Espcially preferred is polyvinyl alcohol which can provide sufficient water resistance with a small amount of crosslinking agent.

The synthetic high polymer latices include stable dispersion of a synthetic high polymer material in an aqueous medium, for example, synthetic rubber latices such as latices of styrenebutadiene copolymer, polybutadiene, acrylonitrile-butadiene copolymer, methyl methacrylate-butadiene copolymer, polychloroprene, polyisoprene, etc. and emulsions of synthetic resins such as vinyl acetate resins (e.g., vinyl acetate homopolymer, vinyl acetate-acrylate copolymer, vinyl acetate-maleate copolymer, ethylene-vinyl acetate copolymer, etc.), polyacrylate resins, acrylate-styrene copolymers, vinyl chloride, polyvinylidene chloride, epoxy resins, polyethylene, polyurethane, polystyrene, etc. In this invention preferred is an acrylic resin emulsion which is somewhat lower in continuous film forming ability than synthetic rubber latices and the like.

The inorganic pigments used in the image receiving layer include, for example, kaolin clay, zinc oxide, synthetic silica, barium sulfate, aluminum oxide, calcium carbonate, titanium oxide, etc. However, for increasing hydrophilicity and water resistance of image receiving layers and further increasing fixability for printer ink, preferably a mixed pigment of synthetic silica and colloidal silica is used.

Said synthetic silica is a synthetic silica gel obtained by gelation of silicic acid, which is highly porous silica gel composed of primary particles three-dimensionally linked through chemical bond which have grown to several mμ to 10 mμ depending on the condition for gelation. In this invention is used this porous synthetic silica having adjusted inner surface area and a particle diameter of 20μ or less. The diameter of fine pores and volume of the fine pores have no special limitations.

The colloidal silica is generally called silica sol and is a colloidal dispersion in water of negatively charged spherical silica particles of 1 to 100 mμ in particle diameter. Method of preparation and physical properties thereof are markedly different from those of the said synthetic silica. The colloidal silica of 50 mμ or less in particle diameter is preferred in this invention.

When the above mentioned mixed pigment is used as the inorganic pigment in this invention, the object of this invention can be attained even if the binder is not the mixed binder mentioned above.

Furthermore, said mixed pigment overcomes the problems which occur when polyvinyl alcohol is used as a hydrophilic binder. That is, synthetic silica fine powder has been used as material of high hydrophilization degree in image receiving layers, but sufficient water resistance cannot be obtained when polyvinyl alcohol is used as a hydrophilic binder and printing cannot be performed. According to Japanese Patent Unexamined Publication No. 211052/84, a large amount of a modified polyamide resin is added to polyvinyl alcohol to gain water resistance, but fixability for printer ink is still insufficient. On the other hand, substitution of colloidal silica for the synthetic silica fine powder has increased water resistance, but caused reduction of hydrophilicity. According to Japanese Patent Unexamined Pulbication No. 58895/80, hydrophilicity is increased by addition of myo-inositol hexaphosphoric acid and a water soluble polyvalent metal salt, but fixability for printer ink is still insufficient.

It has been found by the inventors that direct image printing plate which have sufficient hydrophilicity and water resistance and excellent fixability for printer ink as well as PPC toner and oil ink can be obtained by employing the three components of synthetic silica fine powder, colloidal silica and polyvinyl alcohol as principal components of image receiving layer.

According to this embodiment of this invention, there are utilized the hydrophilicity of the colloidal silica per se and besides such properties of colloidal silica particles that the particles firmly adhere to the surface of fine irregularities of surrounding materials at the time of evaporation of water and that the particles per se form siloxane bond to produce strong bond, whereby it has become possible to greatly improve water resistance of polyvinyl alcohol which cannot be attained by only crosslinking agent.

If necessary, as the inorganic pigment in image receiving layer, there may be used kaolin clay, titanium oxide, barium sulfate, aluminum oxide, calcium carbonate, zinc oxide, etc. in addition to said mixed pigment. In this case, proportion of the mixed pigment comprising synthetic silica fine powder and colloidal silica in the inorganic pigment is at least 30%. When less than 30%, hydrophilicity of image receiving layer decreases to cause stains in background and besides fixability for printer ink is insufficient.

Mixing ratio of the synthetic silica fine powder and the colloidal silica is preferably 20:80 to 0:20, more preferably 40:60 to 60:40.

The polyvinyl alcohol is obtained by saponification of polyvinyl acetate obtained by polymerization of vinyl acetate. Completely saponified polyvinyl alcohols are preferred in this invention. Furthermore, there may also be used modified polyvinyl alcohols such as complete saponification products of vinyl acetate-crotonic acid copolymer, vinyl acetate-maleic anhydride copolymer, vinyl acetate-acrylamide copolymer, etc. and acetoacetylates of complete saponification polyvinyl alcohols. Amount of polyvinyl alcohol added to the inorganic pigment is 3 to 30 parts per 100 parts of the inorganic pigment. When more than 30 parts, fixability for printer ink decreases and when less than 3 parts, water resistance of the image receiving layer lowers. Preferable amount of polyvinyl alcohol is 5 to 20 parts.

The image receiving layer may further contain crosslinking agents such as aldehydes, amines, melamine-formaldehyde resins, urea-formaldehyde resins, hydrazides, persulfates, etc., various inorganic acids and metal salts for improving hydrophilicity or accerelating the crosslinking and defoaming agents.

The direct image printing plates for offset printing of this invention comprises a water-resistant support and an image receiving layer provided on said support as stated before and as the water resistant supports, mention may be made of wood free papers, resin-coated papers, plastic films, etc. which are wet-strengthened with melamine-formaldehyde resin, urea-formaldehyde resin, polyamidoepichlorohydrin resin, etc.

The direct image printing plates for offset printing can be produced by coating a water resistant support with a coating color for image receiving layer which is mainly composed of inorganic pigment and binder according to this invention, then drying the coated layer at 80° to 150° C. to form the image receiving layer in a coverage of about 2 to 30 g/m$^2$.

An intermediate layer may be provided between the water resistant support and the image receiving layer to improve printing endurance. Furthermore, a back coat layer may be provided to prevent curling of the back surface of the water resistant support.

As the intermediate layer (coverage 1 to 20 g/m$^2$), there may be used one or more of said water soluble high polymer compounds, said synthetic high polymer latices, emulsion type resins such as acrylic resins, SBR, MBR, NBR, vinyl acetate -ethylene copolymer, solvent soluble resins such as epoxy resins, polyvinyl butyral resins, vinyl acetate resins, vinyl chloride resins, etc. A suitable amount of pigment may be added to this intermediate layer.

As the back coat layer (coverage 1 to 20 g/m$^2$), there may be used one or more of said water soluble high polymer compounds, said synthetic high polymer latices, cellulose derivatives such as carboxymethyl cellulose and hydroxyethyl cellulose, starch and starch derivatives, water soluble resins such as polyvinyl alcohol, casein, vinyl acetate-crotonic acid copolymer, ammonium polyacrylate, etc., emulsion type resins such as acrylic resins, SBR, MBR, vinyl-acetateethylene copolymer, etc. A suitable amount of pigment may be added to this back coat layer.

EXAMPLE 1

A coating color for intermediate layer having the following composition was coated on a surface of a support (100 g/m$^2$ wet-strengthened paper) and dried at about 120° C. to form an intermediate layer of about 15 g/m$^2$.

[Coating Color for Intermediate Layer]

Carboxyl modified styrene-butadiene latex (solid content 50%): 120 parts
10% aqueous solution of starch: 100 parts
50% aqueous dispersion of Zieclite (trade mark for inorganic pigment of Zieclite Chemical Co.): 200 parts
80% aqueous solution of melamineformaldehyde resin (manufactured by Sumitomo Chemical Co., Ltd.): 12 parts
35% aqueous solution of curing catalyst (accerelater ACX-P: trade mark of Sumitomo Chemical Co. Ltd.): 3 parts
Water: 80 parts Then, a coating color for back coat layer having the following composition was coated on the back surface of the above support and was dried at about 120° C. to provide a back coat layer of about 15 g/m$^2$, which was subjected to calendering treatment to obtain a water resistant support.

[Coating Color for Back Coat Layer]

Styrene-butadiene latex (solid content 50%): 80 parts
10% aqueous solution of polyvinyl alcohol (trade mark PVA 117 of Kuraray Industries, Inc.): 100 parts
50% aqueous dispersion of kaolin clay: 200 parts
80% aqueous solution of melamineformaldehyde resin: 10 parts
10% aqueous solution of ammonium chloride: 8 parts
Water: 50 parts A coating color for image receiving layer having the following composition was coated on said intermediate layer and was dried at about 120° C. to obtain an image receiving layer of about 8 g/m$^2$.

[Coating Color for Image Receiving Layer]

Synthetic silica (trade mark Sylloid 308 of Fuji Davidson Chemical Co.): 20 parts
20% aqueous dispersion of colloidal silica (trade mark Snowtex C of Nissan Chemical Industries, Ltd.): 100 parts
50% aqueous dispersion of kaolin clay: 120 parts
10% aqueous solution of polyvinyl alcohol (trade mark PVA 117 of Kuraray Co., Ltd.): 100 parts
Acrylic acid-silicone copolymer emulsion (solid content 40%, trade mark Silen A-14-1 of Nihon Junyaku Co.): 5 parts
80% aqueous solution of melamine-formaldehyde resin: 1.2 part
10% aqueous solution of ammonium chloride: 1 part
Water: 100 parts This direct image printing plate for offset printing was directly impressed by a dot printer of Mitsubishi Japanese Word processor Office Ace 200 (manufactured by Mitsubishi Electric Corporation) to make a printing plate. This printing plate was immediately mounted on a fully-automatic offset printer (Gestetner 339 manufactured by Gestetner Co.) and printing was carried out to obtain more than 500 clear copies with no stains from the outset. Separately, printing plate was made from said plate by PPC copier Ubix 2500MR (manufactured by Konishiroku Photo Industry Co., Ltd.). This was mounted on said printer and printing was carried out to obtain more than 500 clear copies with no stains from the outset.

COMPARATIVE EXAMPLE 1

A direct image printing plate for offset printing was produced in the same manner as in Example 1 except that the coating color for image receiving layer of the following composition was used. From this plate was made a printing plate by the dot printer used in Example 1, which was immediately mounted on the offset printer used in Example 1 and printing was carried out to find that fixation of printer ink was poor and only unclear copies were obtained.

[Coating Color for Image Receiving Layer]

Synthetic silica (trade mark Sylloid 308): 20 parts
20% aqueous dispersion of colloidal silica (trade mark Snowtex C): 100 parts
50% aqueous dispersion of kaolin clay: 120 parts
10% aqueous solution of polyvinyl alcohol (trade mark PVA 117): 120 parts
80% aqueous solution of melamineformaldehyde resin: 1.5 part 10% aqueous solution of ammonium chloride: 1.2 part
Water: 90 parts

COMPARATIVE EXAMPLE 2

A direct image plate for offset printing was made in the same manner as in Example 1 except that the coating color for image receiving layer of the following composition was used. From this plate was produced a printing plate by the dot printer used in Example 1 and the printing plate was mounted on the offset printer used in Example 1 and printing was carried out. Fixation for printer ink was good, but the copies were stained.

[Coating Color for Image Receiving Layer]

Synthetic silica (trade mark Sylloid 308): 20 parts
20% aqueous dispersion of colloidal silica (trade mark Snowtex C): 100 parts
50% aqueous dispersion of kaolin clay: 120 parts
10% aqueous solution of polyvinyl alcohol: 60 parts
Acrylic acid-silicone copolymer emulsion (solid content 30%, trade mark Silen A-14-1): 15 parts
80% aqueous solution of melamineformaldehyde resin: 0.8 part
10% aqueous solution of ammonium chloride: 0.6 part
Water: 130 parts

EXAMPLE 2

A direct image plate for offset printing was made in the same manner as in Example 1 except that a coating color for image receiving layer of the following composition was used. A printing plate was made from this plate by wire dot printer of Japanese word processor Tosword JW-8S (manufactured by Toshiba Corporation). This printing plate was immediately mounted on a full-automatic offset printer (Ricoh AP-1700 manufacture by Ricoh Co., Ltd.) and printing was carried out to obtain more than 500 clear copies with no stains from the outset. Separately, from the same plate was made a printing plate by the PPC copier used in Example 1 and this printing plate was mounted on a printer and printing was carried out to obtain more than 500 clear copies with no stains from the outset.

[Coating Color for Image Receiving Layer]

Synthetic silica (trade mark Sylloid 978 manufactured by Fuji Davidson Chemical Co.): 20 parts
20% aqueous dispersion of colloidal silica (trade mark Catalloid S I-500 manufactured by Shokubai Kasei Co.): 100 parts
50% aqueous dispersion of kaolin clay 120 parts
10% aqueous solution of polyvinyl alcohol (trade mark Gosenol N 300 manufactured by Japan Synthetic Chemical Co.): 100 parts
Emulsion of ethylene-vinyl chloride copolymer (solid content 50%, trade mark Sumielite 1100K manufactured by Sumitomo Chemical Co., Ltd.): 4 parts
80% aqueous solution of melamineformaldehyde resin: 1.2 part
10% aqueous solution of ammonium chloride: 1 part
Water: 100 parts

EXAMPLE 3

A coating color for intermediate layer having the following composition was coated on a surface of a support (100 $g/m^2$ wet-strengthened paper) and dried at about 130° C. to form an intermediate layer of about 15 $g/m^2$.

[Coating Color for Intermediate Layer]

Carboxyl modified styrene-butadiene latex (solid content 50%): 120 parts
10% aqueous solution of starch: 100 parts
50% aqueous dispersion of (trade mark for inorganic pigment of Chemical Co.): 200 parts
80% aqueous solution of melamineformaldehyde resin (manufactured by Sumitomo Chemical Co. Ltd.): 12 parts
35% aqueous solution of curing catalyst (accerelater ACX-P:trade mark of Sumitomo Chemical Co. Ltd.): 2 parts
Water: 80 parts Then, a coating color for back coat layer having the following composition was coated on the back surface of the above support and was dried at about 130° C. to provide a back coat layer of about 15 $g/m^2$, which was subjected to calendering treatment to obtain a water resistant support.

[Coating Color for Back Coat Layer]

Styrene-butadiene latex (solid content 50%): 10 parts
10% aqueous solution of polyvinyl alcohol (trade mark PVA 117): 50 parts
50% aqueous dispersion of kaolin clay: 100 parts
80% aqueous solution of melamineformaldehyde resin: 2 parts
10% aqueous solution of ammonium chloride: 2 parts
Water: 50 parts A coating color for image receiving layer having the following composition was coated on said intermediate layer and was dried at about 130° C. to obtain an image receiving layer of about 8 $g/m^2$.

[Coating Color for Image Receiving Layer]

Synthetic silica fine powder (trade mark Sylloid 308 of Fuji Davidson Chemical Co.): 40 parts
20% aqueous dispersion of colloidal silica (trade mark Snowtex C of Nissan Chemical Industries, Ltd.): 200 parts
50% aqueous dispersion of kaolin clay: 40 parts
10% aqueous solution of polyvinyl alcohol (trade mark PVA 117 of Kuraray Co., Ltd.): 120 parts
80% aqueous solution of melamineformaldehyde resin: 1.5 part
10% aqueous solution of ammonium chloride: 1.2 part
Water: 50 parts The direct image printing plate for offset printing was directly impressed by a dot printer of Mitsubishi Japanese Word Processor Office Ace 200 (manufactured by Mitsubishi Electric Corporation) to make a printing plate. This printing plate was immediately mounted on a fully-automatic offset printer (Gestetner 339 manufactured by Gestetner Co.) and printing was carried out to obtain more than 500 clear copies with no stains from the outset. Separately, printing plate was made from said plate by PPC copier Ubix 2500MR (manufactured by Konishiroku Photo Industry Co., Ltd.). This was mounted on said printer and printing was carried out to obtain more than 500 clear copies with no stains from the outset.

COMPARATIVE EXAMPLE 3

A direct image printing plate for offset printing was produced in the same manner as in Example 3 except that the coating color for image receiving layer of the following composition was used. From this plate was made a printing plate by the dot printer used in Example 3, which was immediately mounted on the offset printer used in Example 1 and printing was carried out to find that fixation of printer ink was poor and only unclear copies were obtained.

[Coating Color for Image Receiving Layer]

Synthetic silica fine powder (trade mark Sylloid 308, particle diameter 7μ, manufactured by Fuji Davidson Chemical Co.): 80 parts
50% aqueous dispersion of kaolin clay: 40 parts
10% aqueous solution of polyvinyl alcohol (trade mark PVA 117): 120 parts
30% aqueous solution of modified polyamide resin (trade mark Epinox P-9007Y, manufactured by Dick Hercules Co.): 50 parts
10% aqueous solution of ammonium chloride: 1.2 part
water: 340 parts

COMPARATIVE EXAMPLE 4

A direct image printing plate for offset printing was made in the same manner as in Example 3 except that the coating color for image receiving layer of the following composition was used. From this plate was produced a printing plate by the dot printer used in Example 3 and the printing plate was mounted on the offset printer used in Example 1 and printing was carried out. Fixation for printer ink was poor, and only unclear copies with stains from the outset were obtained.

[Coating Color for Image Receiving Layer]

20% aqueous dispersion of colloidal silica (trade mark Snowtex C, particle diameter 10–20 mμ, manufactured by Nissan Chemical Industries): 400 parts
50% aqueous dispersion of kaolin clay: 40 parts
10% aqueous solution of polyvinyl alcohol (trade mark Poval 117, manufactured by Kuraray Co., Ltd.): 500 parts
40% aqueous solution of glyoxal: 30 parts
50% aqueous solution of myo-inositol hexaphosphoric acid: 40 parts
Cobalt sulfate: 2 parts

COMPARATIVE EXAMPLE 5

A direct image printing plate for offset printing was produced in the same manner as in Example 3 except that the coating color for image receiving layer of the following composition was used. From this plate was made a printing plate by the dot printer used in Example 3, which was immediately mounted on the offset printer used in Example 3 and printing was carried out to find that fixation of printer ink was poor and only unclear copies were obtained from the outset.

[Coating Color for Image Receiving Layer]

Synthetic silica fine powder (trade mark Sylloid 308): 40 parts
20% aqueous dispersion of colloidal silica (trade mark Snowtex C): 200 parts
50% aqueous dispersion of kaolin clay: 40 parts
10% aqueous solution of carboxymethyl cellulose: 150 parts
Polyglycidyl ether (trade mark Denckol EX920 manufactured by Nagase Kasei Co.): 20 parts
Water: 225 parts

EXAMPLE 4

A direct image printing plate for offset printing was made in the same manner as in Example 3 except that a coating color for image receiving layer of the following composition was used. A printing plate was made from this plate by dot printer. This printing plate was immediately mounted on an offset printer and printing was carried out to obtain more than 500 clear copies with no stains from the outset. Separately, from the same plate was made a printing plate by the PPC copier used in Example 3 and this printing plate was mounted on a printer and printing was carried out to obtain more than 500 clear copies with no stains from the outset.

[Coating Color for Image Receiving Layer]

Synthetic silica fine powder (Trade mark Sylloid 978, particle diameter 4μ, manufactured by Fuji Davidson Chemical Co.): 30 parts
20% aqueous dispersion of colloidal silica (Trade mare Catalloid S I-500, particle diameter 7–9 mμ, manufactured by Shokubai Kasei Co.): 150 parts
50% aqueous dispersion of kaolin clay: 80 parts
10% aqueous solution of polyvinyl alcohol (Trade mark Gosenol N 300 manufactured by Japan Synthetic Chemical Co.): 100 parts
80% aqueous solution of melamineformaldehyde resin: 1.25 part
10% aqueous solution of ammonium chloride: 1 part
Water: 50 parts

What is claimed is:

1. A direct image printing plate for offset printing which comprises a water resistant support and an image receiving layer provided thereon which comprises an inorganic pigment and a mixed binder comprising a water-soluble high polymer compound and a synthetic high polymer latex.

2. A direct image printing plate for offset printing which comprises a water resistant support and an image receiving layer provided thereon which comprises a mixed pigment comprising a synthetic silica fine powder of 20μ or less in particle diameter and a colloidal silica of 50 mμ or less in particle diameter and a binder.

3. A direct image printing plate for offset printing according to claim 1 wherein the mixed binder comprises 5 to 80 parts by weight of the synthetic high polymer latex and 100 parts by weight of the water-soluble high polymer compound.

4. A direct image printing plate for offset printing according to claim 1 wherein the water-soluble high polymer compound is polyvinyl alcohol.

5. A direct image printing plate for offset printing according to claim 1 wherein the synthetic high polymer latex is an acrylic emulsion.

6. A direct image printing plate for offset printing according to claim 2 wherein the inorganic pigment comprises at least 30% of the mixed pigment.

7. A direct image printing plate for offset printing according to claim 2 wherein the mixing ratio of the synthetic silica fine powder and the colloidal silica is 20:80 to 80:20.

8. A direct image printing plate for offset printing according to claim 2 wherein the binder is polyvinyl alcohol.

9. A direct image printing plate for offset printing according to claim 1 wherein the amount of the mixed binder is 3 to 30 parts for 100 parts by weight of the pigment.

10. A direct image printing plate for offset printing according to claim 1 which has an intermediate layer between the support and the image receiving layer.

11. A direct image printing plate for offset printing according to claim 2 which has an intermediate layer between the support and the image receiving layer.

* * * * *